(12) United States Patent
Ku et al.

(10) Patent No.: US 11,940,646 B2
(45) Date of Patent: Mar. 26, 2024

(54) KEYSWITCH BACKLIGHT STRUCTURE AND ILLUMINATED KEYSWITCH STRUCTURE THEREWITH

(71) Applicant: DARFON ELECTRONICS CORP., Taoyuan (TW)

(72) Inventors: Shih-Yung Ku, Taoyuan (TW); Hsin-Cheng Ho, Taoyuan (TW)

(73) Assignee: DARFON ELECTRONICS CORP., Taoyuan (TW)

(*) Notice: Subject to any disclaimer, the term of this patent is extended or adjusted under 35 U.S.C. 154(b) by 0 days.

(21) Appl. No.: 18/134,575

(22) Filed: Apr. 14, 2023

(65) Prior Publication Data

US 2023/0341607 A1   Oct. 26, 2023

(30) Foreign Application Priority Data

Apr. 26, 2022  (TW) .................................. 111115889

(51) Int. Cl.
*F21V 8/00* (2006.01)
*G02B 1/11* (2015.01)
(Continued)

(52) U.S. Cl.
CPC .............. *G02B 6/0043* (2013.01); *G02B 1/11* (2013.01); *G02B 6/0036* (2013.01); *G02B 6/0055* (2013.01); *G02B 6/0088* (2013.01); *G06F 3/0202* (2013.01); *H01H 13/023* (2013.01); *H01H 13/14* (2013.01);
(Continued)

(58) Field of Classification Search
CPC ... G02B 6/0036; G02B 6/0043; G06F 1/1616; H01H 13/023
See application file for complete search history.

(56) References Cited

U.S. PATENT DOCUMENTS

| 9,502,191 B1 | 11/2016 | Chen |
| 11,231,538 B1 * | 1/2022 | Kuo ..................... G02B 6/0038 |

(Continued)

FOREIGN PATENT DOCUMENTS

| CN | 211907299 U | 11/2020 |
| TW | 201426800 A | 7/2014 |

(Continued)

*Primary Examiner* — Keith G. Delahoussaye
(74) *Attorney, Agent, or Firm* — Winston Hsu (57) ABSTRACT

A keyswitch backlight structure includes a light-guiding layer, a reflective layer, and a transparent adhesive layer. The light-guiding layer has a bottom surface, a light-emitting surface opposite to the bottom surface, and a surface microstructure formed on the light-emitting surface. The reflective layer is disposed opposite to the bottom surface. The transparent adhesive layer is closely attached to and between the reflective layer and the light-guiding layer corresponding to the surface microstructure. An illuminated keyswitch structure includes base plate, a keycap, a supporting mechanism, and the above keyswitch backlight structure. The keyswitch backlight structure and the base plate are stacked. The supporting mechanism is connected to and between the base plate and the keycap for lifting the keycap relative to the base plate. Light entering the light-guiding layer exits the light-guiding layer through the light-emitting surface to illuminate a transparent indication area of the keycap.

16 Claims, 9 Drawing Sheets

(51) Int. Cl.

| | |
|---|---|
| *G06F 1/16* | (2006.01) |
| *G06F 3/02* | (2006.01) |
| *H01H 13/02* | (2006.01) |
| *H01H 13/14* | (2006.01) |
| *H01H 13/704* | (2006.01) |
| *H01H 13/7057* | (2006.01) |
| *H01H 13/7065* | (2006.01) |

(52) U.S. Cl.
CPC ...... *H01H 13/704* (2013.01); *H01H 13/7057* (2013.01); *H01H 13/7065* (2013.01); *G06F 1/1616* (2013.01)

(56) References Cited

U.S. PATENT DOCUMENTS

| | | | |
|---|---|---|---|
| 11,747,546 B2 * | 9/2023 | Horiuchi | G02B 6/0055 |
| | | | 362/23.03 |
| 2020/0051761 A1 * | 2/2020 | Hsieh | H01H 13/83 |
| 2022/0068572 A1 * | 3/2022 | Liang | G02B 6/0031 |

FOREIGN PATENT DOCUMENTS

| | | |
|---|---|---|
| TW | 201426801 A | 7/2014 |
| TW | 201916086 A | 4/2019 |
| TW | 202009968 A | 3/2020 |
| TW | M625545 U | 4/2022 |

\* cited by examiner

KEYSWITCH BACKLIGHT STRUCTURE AND ILLUMINATED KEYSWITCH STRUCTURE THEREWITH

BACKGROUND OF THE INVENTION

1. Field of the Invention

The present invention relates to an illuminated keyswitch structure, and more particularly to a keyswitch backlight structure of an illuminated keyswitch structure.

2. Description of the Prior Art

In the backlight structure of the traditional illuminated keyswitch structures, if the light guide plate is located under the base plate, in order to allow the light to pass through the base plate to illuminate the keycap, the base plate needs to form multiple openings for the light to pass through. Some of the openings may be close to the underside of an edge of the keycap, so that a user may directly see the glare from the opening when using the keyboard, causing discomfort to the user's eyes. Although the discomfort to the user's eyes can be reduced or eliminated by reducing the intensity of the overall backlight, it will seriously affect the illuminating effect of the backlight on light-transmitting characters of the keycap. If mask printing is implemented on the light guide plate, it can improve the intensity of light received by the user from these openings, or directly block the light that may leak out of the keycap, but the intensity of the backlight here will decrease; for example, the illumination for the light-transmitting characters on the keycap near the edges is significantly reduced.

SUMMARY OF THE INVENTION

An objective of the invention is to provide a keyswitch backlight structure, which uses a microstructure formed on the light-emitting surface of a light-guiding layer thereof to diffuse the light emitted from the light-emitting surface, thereby making the light soft.

A keyswitch backlight structure according to the invention includes a light-guiding layer, a reflective layer, and a transparent adhesive layer. The light-guiding layer has a bottom surface, a light-emitting surface opposite to the bottom surface, and a surface microstructure formed on the light-emitting surface. The reflective layer is disposed under the light-guiding layer opposite to the bottom surface. The transparent adhesive layer is closely attached to and between the reflective layer and the light-guiding layer corresponding to the surface microstructure. Thereby, the light in the light-guiding layer that exits the light-guiding layer through the surface microstructure on the light-emitting surface will diverge and become soft. If the light is received by user's eyes, the eye irritation can also be improved.

Another objective of the invention is to provide an illuminated keyswitch structure, which includes the above keyswitch backlight structure and therefore uses the microstructure formed on the light-emitting surface of the light-guiding layer to diffuse the light emitted from the light-emitting surface, thereby making the light soft. Even if the light leaks from an edge of a keycap and is received by user's eyes, the eye irritation can also be improved.

An illuminated keyswitch structure according to the invention includes a base plate, a keyswitch backlight structure, a keycap, and a supporting mechanism. The keyswitch backlight structure is stacked on or under the base plate. The keyswitch backlight structure includes a light-guiding layer, a reflective layer, and a transparent adhesive layer. The light-guiding layer has a bottom surface, a light-emitting surface opposite to the bottom surface, and a surface microstructure formed on the light-emitting surface. The reflective layer is disposed under the light-guiding layer opposite to the bottom surface. The transparent adhesive layer is closely attached to and between the reflective layer and the light-guiding layer corresponding to the surface microstructure. The keycap is disposed above the base plate and has a transparent indication area. The supporting mechanism is connected to and between the base plate and the keycap, so that the keycap moves up and down relative to the base plate and the keyswitch backlight structure through the supporting mechanism. Therein, light entering the light-guiding layer exits the light-guiding layer through the light-emitting surface to illuminate the transparent indication area. Thereby, the light in the light-guiding layer that exits the light-guiding layer through the surface microstructure on the light-emitting surface will diverge and become soft. If the light leaks from an edge of the keycap and is received by user's eyes, the eye irritation can also be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
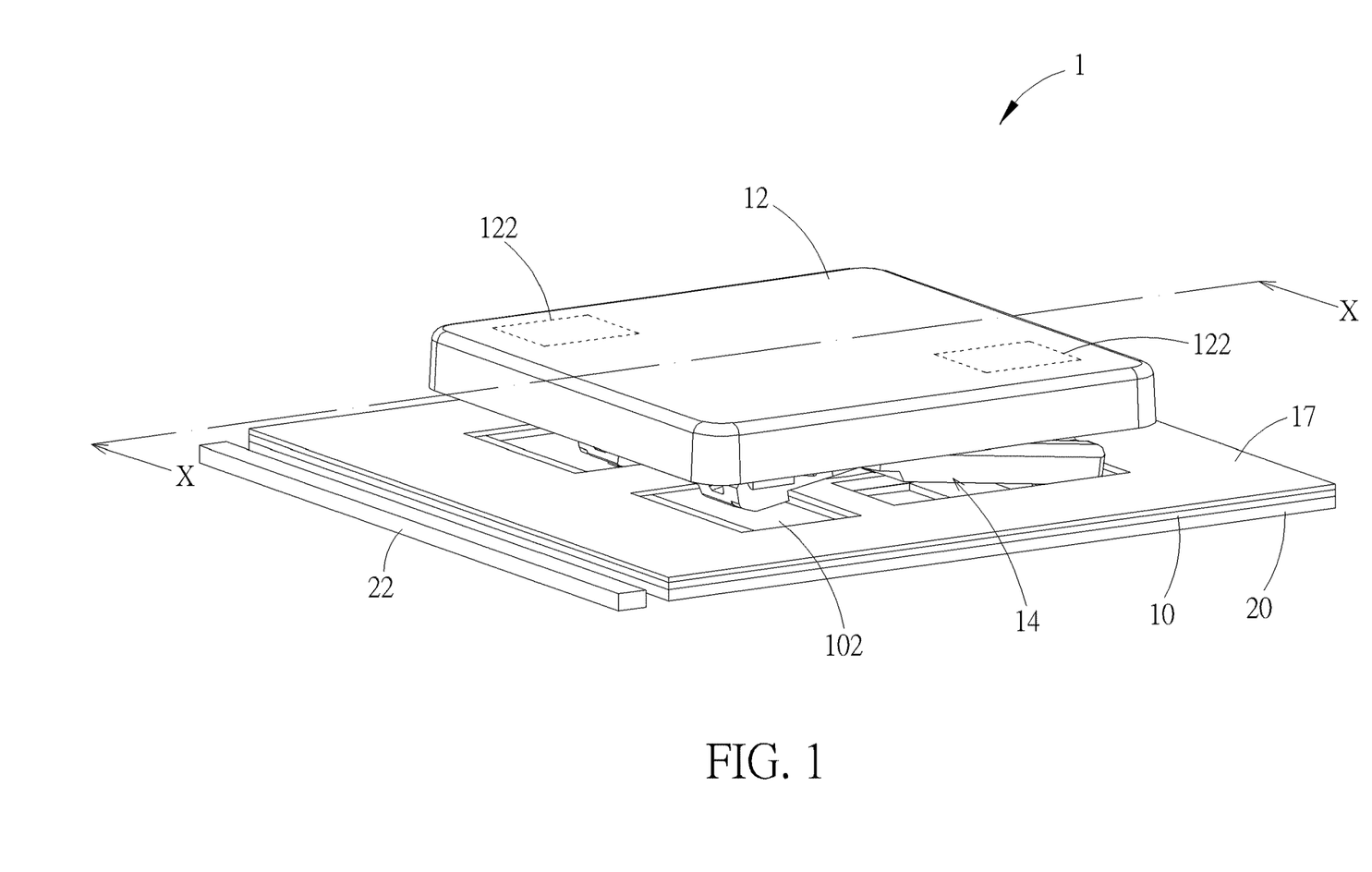
FIG. 1 is a schematic diagram illustrating an illuminated keyswitch structure according to a first embodiment.
Figure 2:
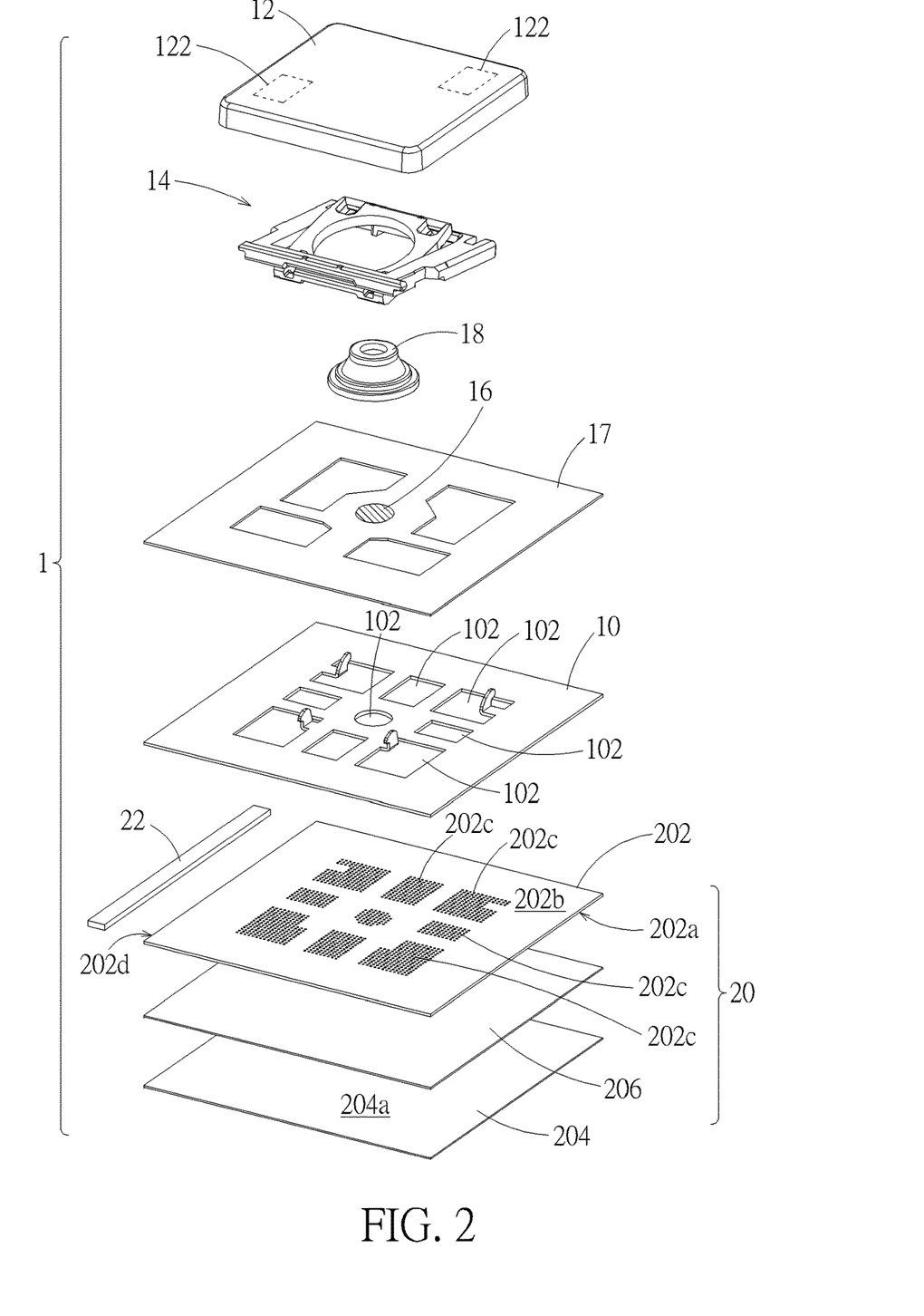
FIG. 2 is a partially exploded view of the illuminated keyswitch structure in FIG. 1.
Figure 3:
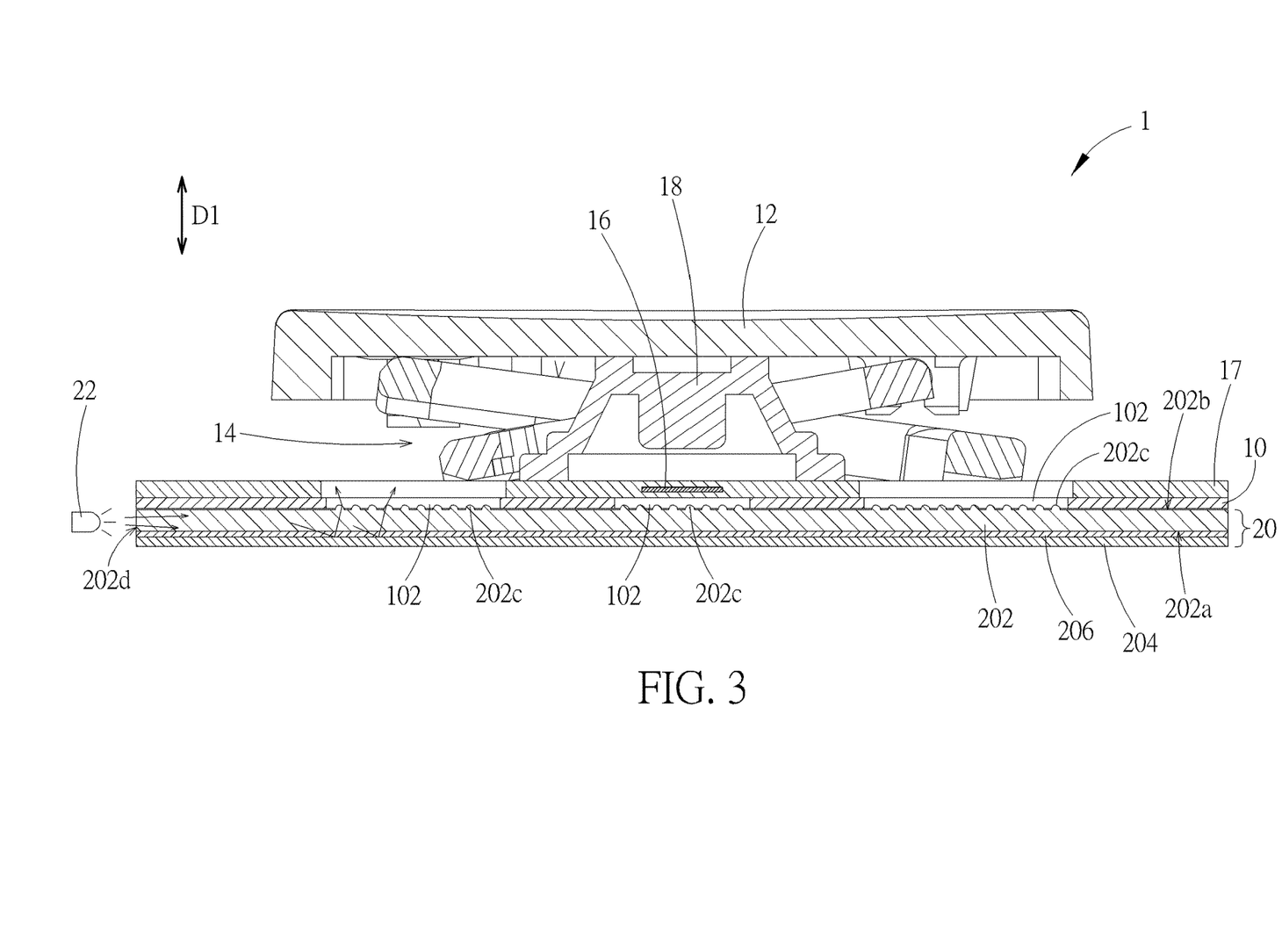
FIG. 3 is a sectional view of the illuminated keyswitch structure along the line X-X in FIG. 1.

Please refer to FIG. 1 to FIG. 3. An illuminated keyswitch structure 1 according to a first embodiment includes a base plate 10, a keycap 12, a supporting mechanism 14, a switch 16 (indicated by a hatched circle in FIG. 2), a resilient part 18, a keyswitch backlight structure 20 (shown by a single structure in FIG. 1 for drawing simplification; in FIG. 3, its dimensions are exaggerated for illustrating its structural details), and a light source 22 (shown by a simple geometric block in the figures). The keycap 12 is disposed above the base plate 10. The supporting mechanism 14 is realized by a scissors support, but it is not limited thereto in practice. For example, the supporting mechanism 14 can be realized by a butterfly support (or a V-shaped support). The supporting mechanism 14 is connected to and between the base plate 10 and the keycap 12, so that the keycap 12 can move up and down relative to the base plate 10 (i.e. moving along a vertical direction D1) through the supporting mechanism 14. The switch 16 is disposed under the keycap 12. The resilient part 18 is disposed between the keycap 12 and the switch 16. The resilient part 18 can be realized by an elastic rubber dome, but it is not limited thereto in practice. For example, the resilient part 18 can be realized by a coil spring. When the keycap 12 move downward toward the base plate 10, the keycap 12 will squeeze the resilient part 18 to trigger the switch 16. When the keycap 12 is no longer pressed by the external force, the elastically deformable resilient part 18 can drive the keycap 12 to move upwards and return to its original position. The keyswitch backlight structure 20 is stacked under the base plate 10. The light source 22 is disposed adjacent to the keyswitch backlight structure 20. The light source 22 can be realized by, but not limited to one or more light-emitting parts (such as light-emitting diodes), and can also be realized by a light bar or other devices that can provide light. Light emitted by the light source 22 (indicated by several arrows in FIG. 3) can enter the keyswitch backlight structure 20 and be directed to the keycap through the keyswitch backlight structure 20, thereby providing backlight for the keycap 12. The keycap 12 has a plurality of transparent indication areas 122 (indicated by dashed rectangles on the keycap 12). The above backlight illuminates the transparent indication areas 122 and can pass through the transparent indication areas 122 to produce an optical indication effect. The profile of the transparent indication area 122 can be geometric figures or characters. Furthermore, in practice, the switch 16 can be realized by, but not limited to a membrane circuit board 17 (e.g., which realized by a three-layer structure, in which switch circuitry is formed on the upper and lower layers, and the insulating layer provided between the upper and lower layers provides insulation for the switch circuitry; it is shown in a single structure in the figures for drawing simplification).

In the first embodiment, the keyswitch backlight structure 20 includes a light-guiding layer 202, a reflective layer 204, and a transparent adhesive layer 206. The light-guiding layer 202 has a bottom surface 202a, a light-emitting surface 202b opposite to the bottom surface 202a, and a plurality of surface microstructures 202c formed on the light-emitting surface 202b. The reflective layer 204 is disposed under the light-guiding layer 202 opposite to the bottom surface 202a. The transparent adhesive layer 206 is closely attached to and between the reflective layer 204 and the light-guiding layer 202 corresponding to the surface microstructures 202c. The light-guiding layer 202 has a light incident side surface 202d between the bottom surface 202a and the light-emitting surface 202b. The light-emitting surface of the light source 22 faces the light incident side surface 202d. The light emitted by the light source 22 can enter the light-guiding layer 202 through the light incident side surface 202d. In practice, the surface microstructures 202c can be located, but not limited to directly below the transparent indication areas 122.

The reflective layer 204 can reflect the light, so as to increase the utilization rate of the light and improve the backlight intensity. The light in the light-guiding layer 202 exits the light-guiding layer 202 from the light-emitting surface 202b to serve as the backlight for the keycap 12. The light in the light-guiding layer 202 that exits the light-guiding layer 202 through the surface microstructures 202c on the light-emitting surface 202b will diverge, making the backlight at the locations soft and increasing the uniformity of the backlight at the locations. The intensity of the divergent light decreases significantly with increasing distance. Even if the light is received by user's eyes, the eye irritation can also be improved effectively. Furthermore, if reflective points are provided on the bottom surface 202a of the light-guiding layer 202 or on the reflective layer 204, the surface microstructure 202c can also blur the light reflection points generated by these reflective points. In addition, the surface microstructure 202c in FIG. 3 is shown only by hemispheres; in practice, any microstructure as a whole that can diffuse light can be used as a surface microstructure, which will not be described in addition.

Figure 4:
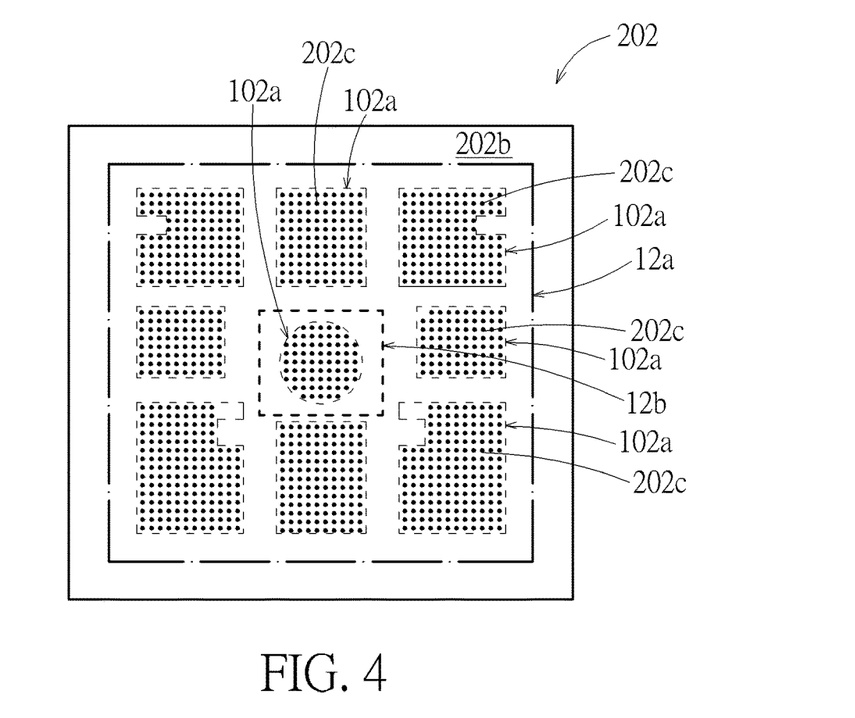
FIG. 4 is a top view of a light-guiding layer of the illuminated keyswitch structure in FIG. 2.

Please refer to FIG. 4, which is a top view of the light-guiding layer 202. Therein, the surface microstructure 202c is represented by a plurality of solid dots (also applying to FIG. 2), and the projection 12a of the keycap 12 on the light-guiding layer 202 (or the light-emitting surface 202b thereof) is shown in thick chain lines. The light-guiding layer 202 has nine surface microstructures 202c (or nine microstructure areas) for one keycap 12. The profile 12a of the keycap 12 can define a center area 12b (i.e., the area enclosed by the thick dashed lines in the figure) and a peripheral area (i.e., the area between the thick chain lines and the thick dashed lines) surrounding the center area 12b. The surface microstructures 202c are distributed in both the center area 12b and the peripheral area. Therein, the surface microstructures 202c corresponding to the peripheral area are close to the edges of the projection 12a of the keycap 12, so the light leakage (i.e., the light emitted from the light-emitting surface 202b of the light-guiding layer 202 and passes by the edges of the keycap 12) will be diffused by the surface microstructures 202c and become soft, which can effectively reduce the degree glaring of the light leakage to the user's eyes.

Furthermore, in the first embodiment, the surface microstructure 202c is disposed corresponding to a corresponding opening 102 of the base plate 10 (in which the projection 102a of the profile of the opening 102 on the light-guiding layer 202 is shown in thin dashed lines), so that the surface microstructure 202c is exposed from the corresponding opening 102. The distribution area of the surface microstructure 202c is equivalent to the corresponding opening 102 profile; however, it is not limited thereto in practice. For example, the distribution area of one single surface microstructure 202c is slightly larger than the profile of the corresponding opening 102. For another example, the light-guiding layer 202 is provided with a surface microstructure on the entire light-emitting surface 202b. Moreover, the light-guiding layer 202 is not limited to a single-layer structure in practice. Furthermore, the distribution area of the surface microstructure 202c and the projection 102a of the corresponding opening 102 on the light-guiding layer 202 both fall within the projection 12a of the keycap 12; however, it is not limited thereto in practice.

Figure 5:
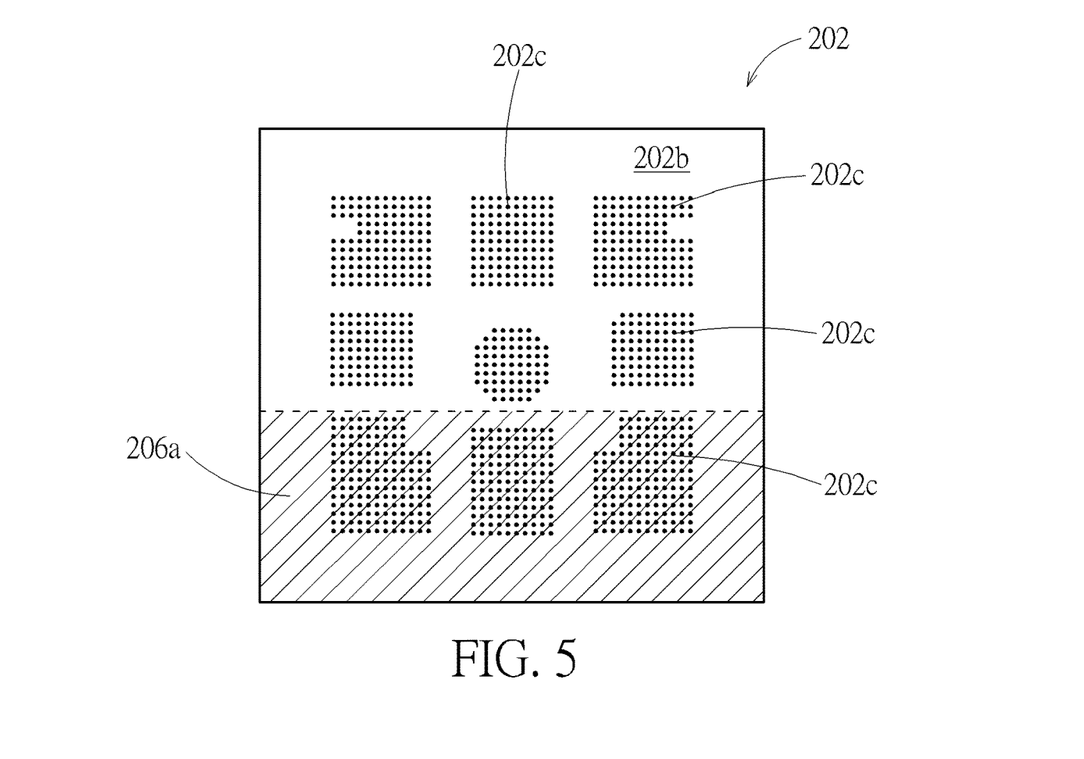
FIG. 5 is a top view of the distribution of a transparent adhesive layer corresponding to the light-guiding layer according to an embodiment.
Figure 6:
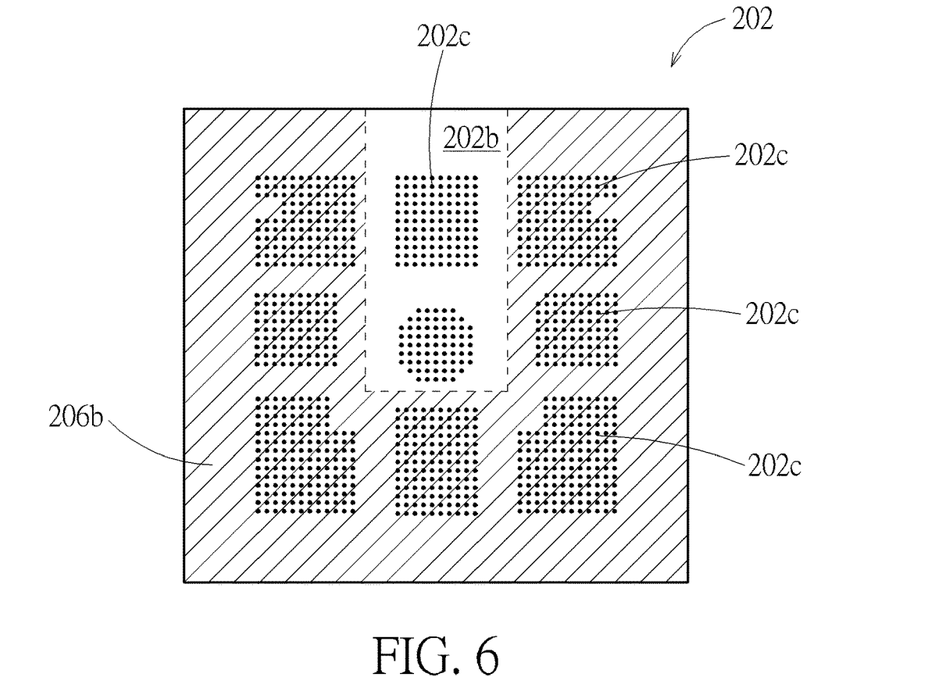
FIG. 6 is a top view of the distribution of the transparent adhesive layer corresponding to the light-guiding layer according to another embodiment.
Figure 7:
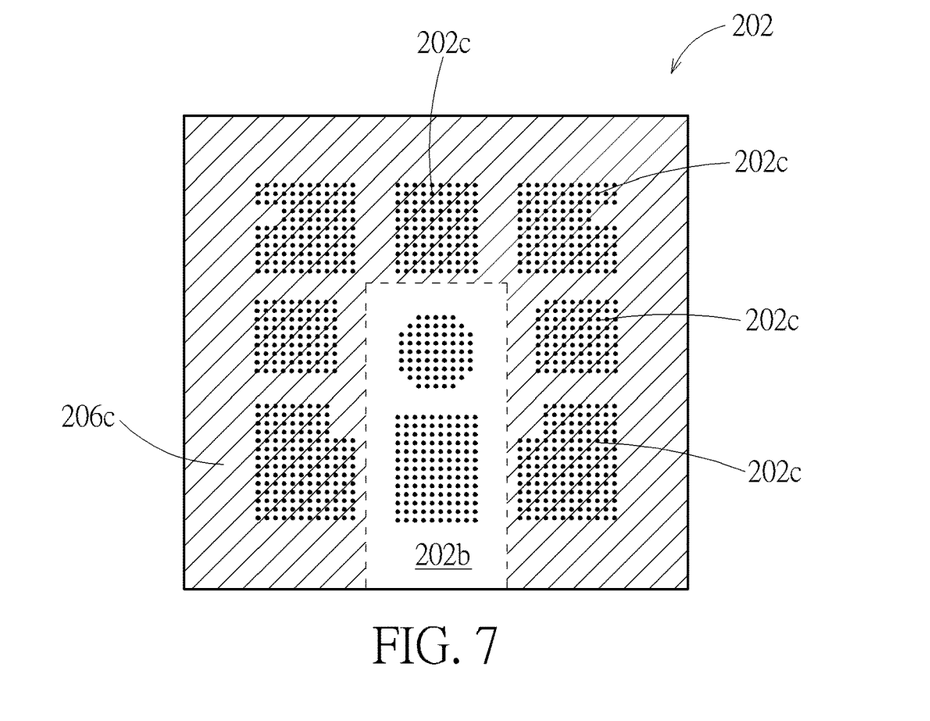
FIG. 7 is a top view of the distribution of the transparent adhesive layer corresponding to the light-guiding layer according to another embodiment.
Figure 8:
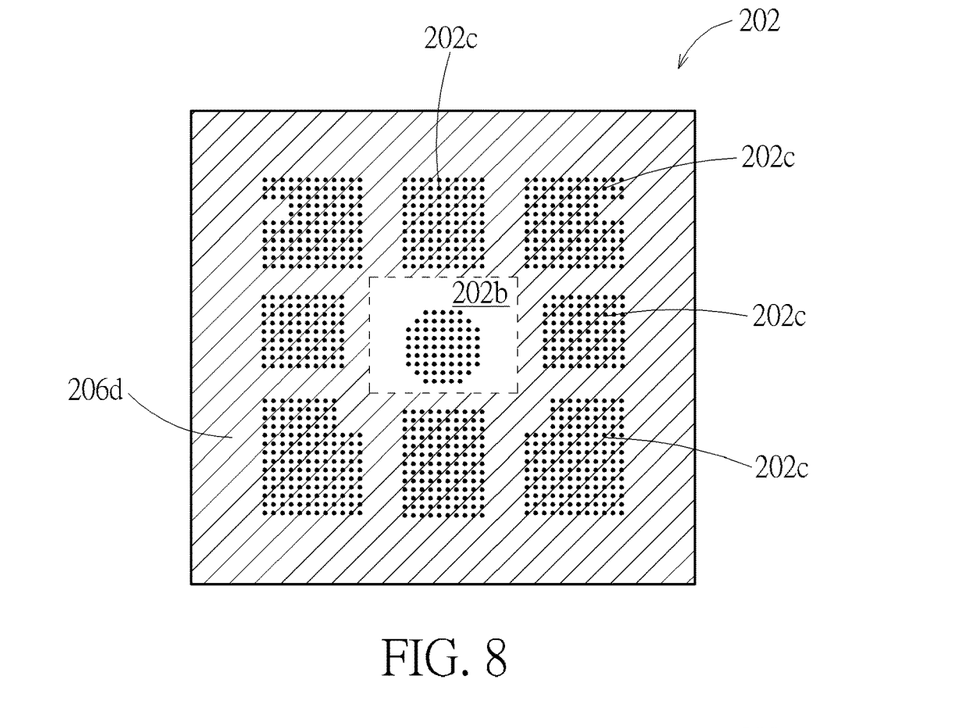
FIG. 8 is a top view of the distribution of the transparent adhesive layer corresponding to the light-guiding layer according to another embodiment.

In addition, in the first embodiment, the transparent adhesive layer 206 can be made of appropriate materials so that its light transmittance meets requirements, such as but not limited to greater than or equal to 90%. Moreover, the transparent adhesive layer 206 is filled between the light-guiding layer 202 and the reflective layer 204; however, it is not limited thereto in practice. For example, the transparent adhesive layer 206 is only disposed corresponding to several surface microstructures 202c, as shown by FIG. 5 to FIG. 8 (the corresponding projections of the transparent adhesive layers 206a-d on the light-guiding layer 202 are shown by hatched areas in the figures). Therein, the transparent adhesive layer 206a in FIG. 5 is distributed in a straight shape and located on the lower side (e.g., in a keyboard using the illuminated keyswitch structure 1, the transparent adhesive layer 206a is located on the side of the illuminated keyswitch structure 1 close to the user); in FIG. 6, the transparent adhesive layer 206b is distributed in a U shape without an opening upward (e.g., in a keyboard using illuminated keyswitch structure 1, the opening faces the side of the illuminated keyswitch structure 1 away from the user); in FIG. 7, the transparent adhesive layer 206c is distributed in an n shape; in FIG. 8, the transparent adhesive layer 206d is distributed in a rectangle square. Furthermore, in the above embodiments, the surface microstructures 202c corresponding to the transparent adhesive layer 206 and 206a-d fall within the projections of the transparent adhesive layers 206 and 206a-d on the light-emitting surface 202b; however, it is not limited thereto in practice.

Figure 9:
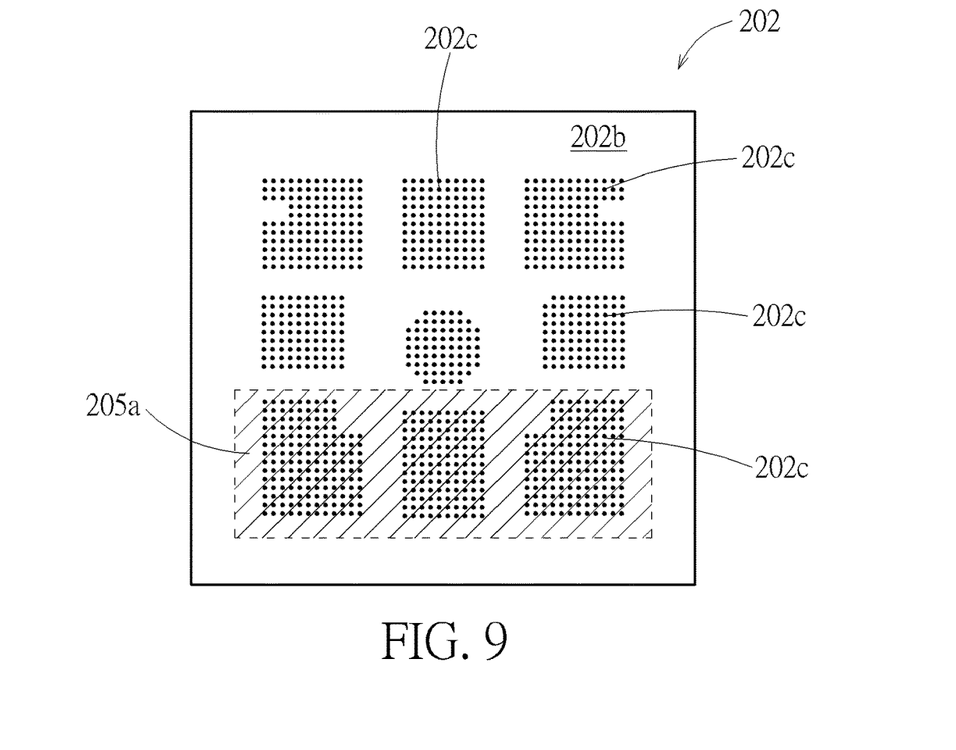
FIG. 9 to FIG. 12 is top views of the distribution of a low reflective layer corresponding to the light-guiding layer according to different embodiments.
Figure 10:
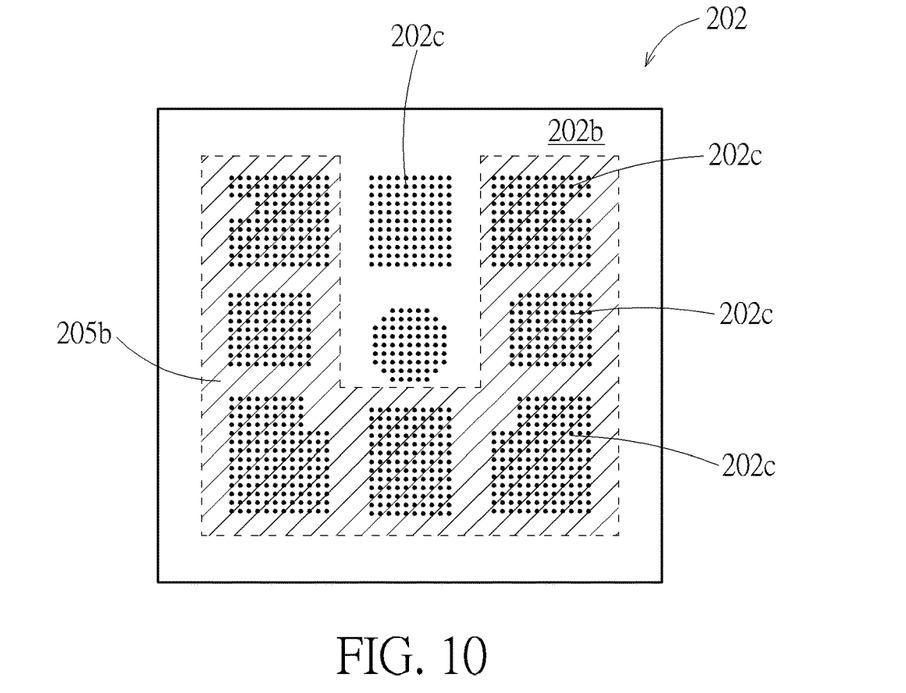
Figure 11:
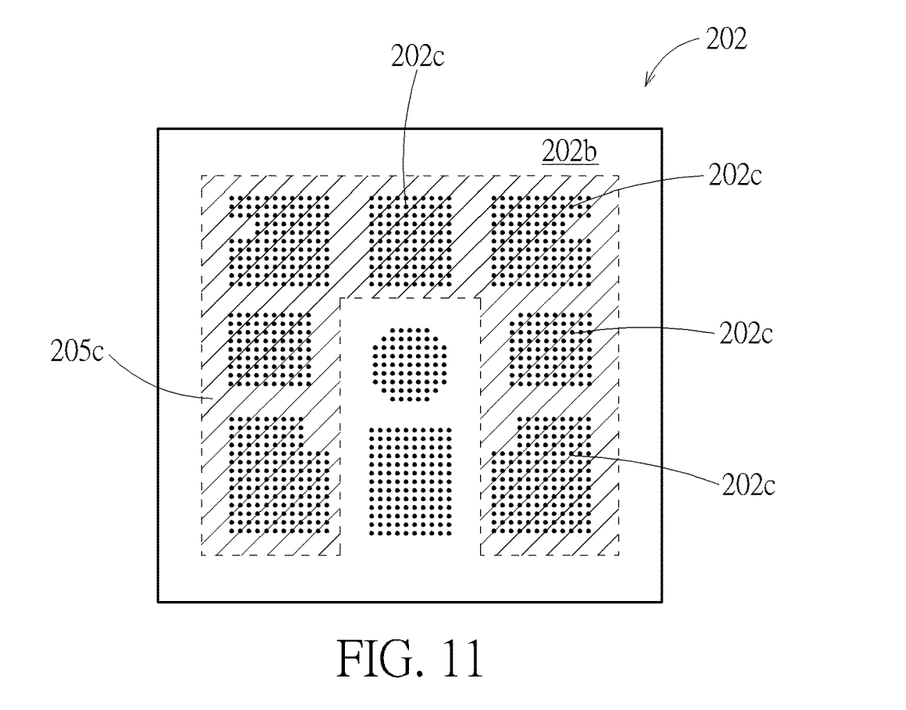
Figure 12:
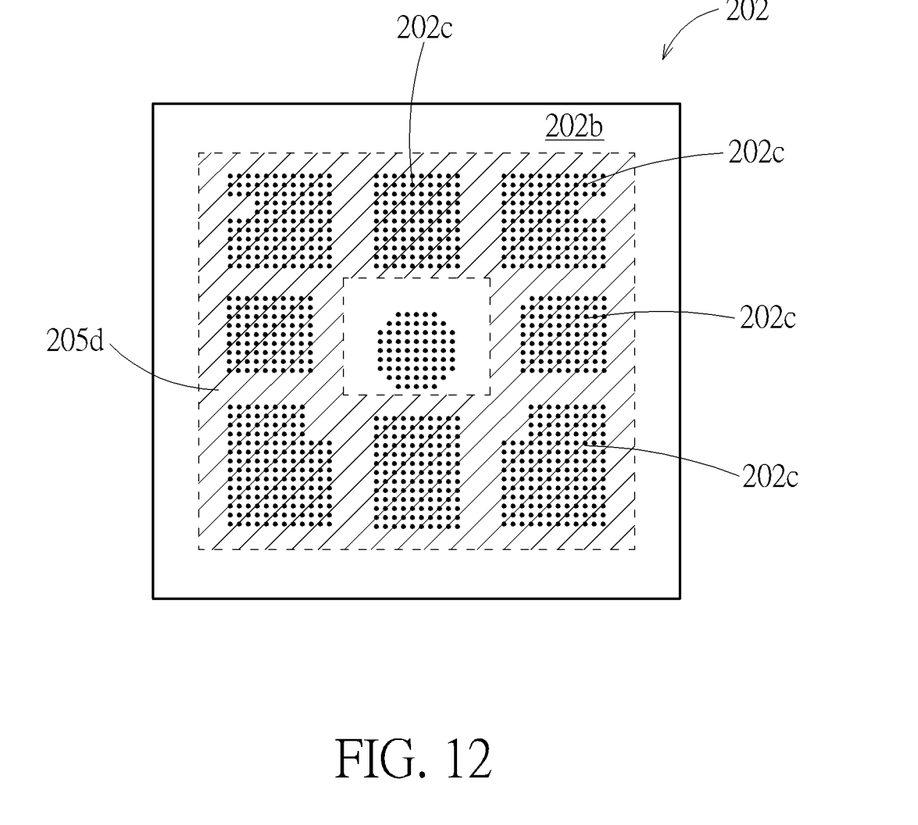

In addition, in practice, in the first embodiment, a low reflective layer is formed corresponding to the surface microstructure 202c on a surface 204a of the reflective layer 204 facing the light-guiding layer 202 (e.g., but not limited by printing on the surface 204a), so as to locally reduce the intensity of the reflected light, thereby reducing the intensity of light leakage. Therein, the reflectance of the low reflective layer is lower than the reflectance of the reflective layer 204. This structural design can reduce the degree glaring of the light leakage without excessively affecting the intensity of the backlight. In practice, the disposition of the low reflective layer on the surface 204a can be determined according to the needs; it is not necessary to dispose the low reflective layer over the entire surface 204a corresponding to all the surface microstructures 202c. For example, as shown by FIG. 9 to FIG. 12 (in which the projections corresponding to the low reflective layers 205a-d are represented by hatched areas, respectively), the low reflective layer 205a in FIG. 9 is distributed in a straight shape (e.g., on the side of the illuminated keyswitch structure 1 close to the user); the low reflective layer 205b in FIG. 10 is distributed in a U shape without an opening upward (e.g., the opening faces the side of the illuminated keyswitch structure 1 away from the user); the low reflective layer 205c in FIG. 11 is distributed in an n shape; the reflective layer 205d is distributed in a rectangle square. Furthermore, in the above embodiments, the surface microstructures 202c corresponding to the low reflective layers 205a-d fall within the projections of the low reflective layers 205a-d on the light-emitting surface 202b; however, it is not limited thereto in practice.

Furthermore, in the first embodiment, the base plate 10 is stacked on the keyswitch backlight structure 20 (or the light-emitting surface 202b of the light-guiding layer 202 thereof). The base plate 10 can be realized by, but not limited to a metal plate in practice, which itself is not transparent, but its opening 102 can allow light to pass through, so it can provide a masking function for the light-guiding layer 202 in principle. On the other hand, in logic, the base plate 10 can also serve as an opaque covering layer, which can also be regarded as a part of the keyswitch backlight structure 20, which will not be further described. In addition, in practice, another component can be used as an opaque covering layer (which has an opening to expose the surface microstructure 202c and allows the light emitted from the light-emitting surface 202b to pass through) to provide the light-emitting surface 202b of the light-guiding layer 202 masking Effect.

Figure 13:
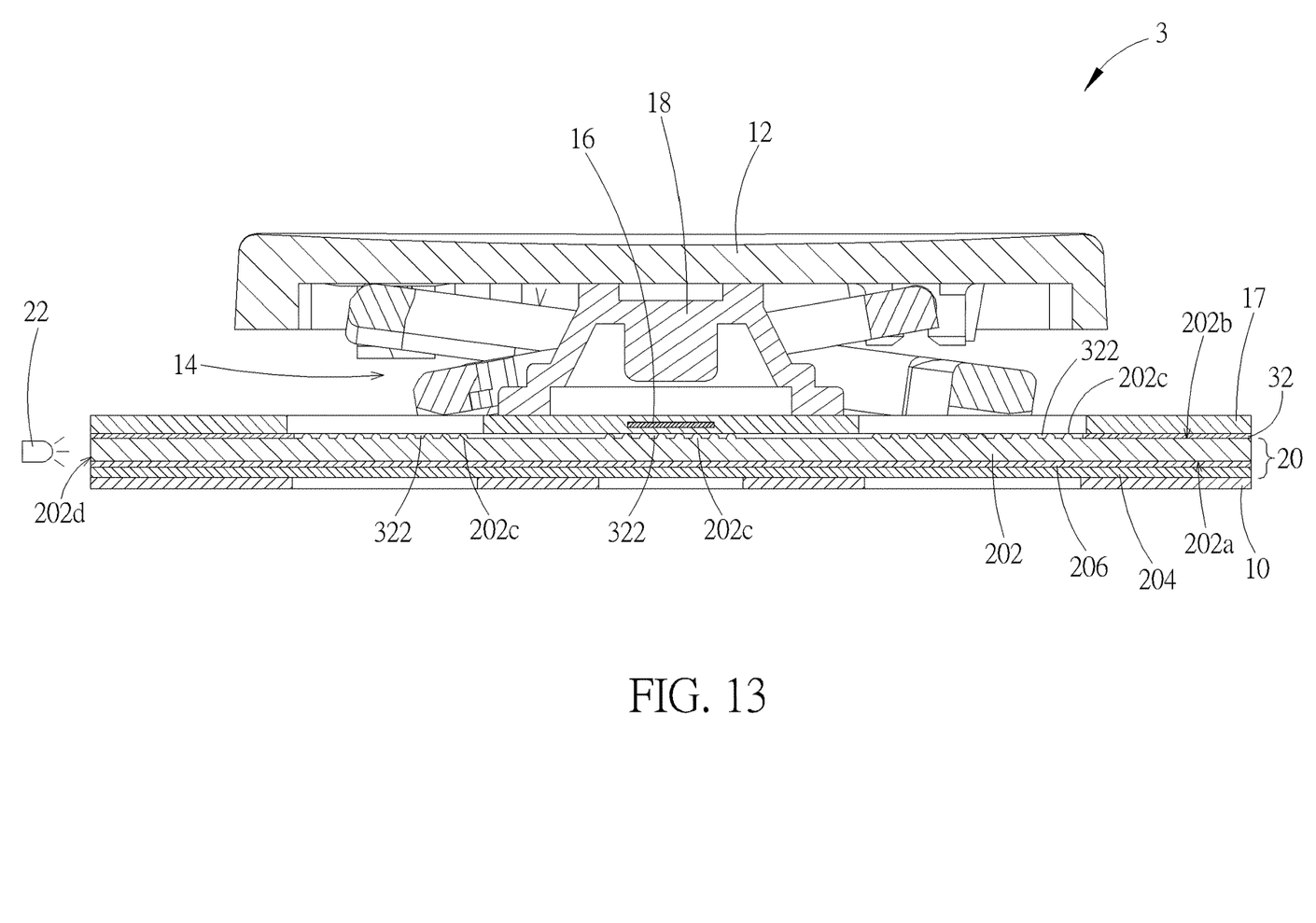
FIG. 13 is a sectional view of an illuminated keyswitch structure according to a second embodiment.

In addition, in the first embodiment, the keyswitch backlight structure 20 is stacked under the base plate 10; however, it is not limited thereto. Please refer to FIG. 13, of which the cutting plane position is equivalent to the position of the line X-X relative to the illuminated keyswitch structure 1 in FIG. 1. An illuminated keyswitch structure 3 according to a second embodiment is structurally similar to the illuminated keyswitch structure 1 and uses the component symbols of the illuminated keyswitch structure 1. Therefore, the relevant descriptions of the illuminated keyswitch structure 1 and variants thereof are also applicable to the illuminated keyswitch structure 3, and will not be repeated in addition. A main different between the illuminated keyswitch structure 3 and the illuminated keyswitch structure 1 is that the keyswitch backlight structure 20 of the illuminated keyswitch structure 3 is located above the base plate 10 and under the membrane circuit board 17, and the illuminated keyswitch structure 3 further includes an opaque covering layer 32 stacked on the light-guiding layer 202 for blocking light. The opaque covering layer 32 has an opening 322. The surface microstructure 202c is exposed from the opening 322, so that light emitted from the light-guiding layer 202 can pass through the opening 322 to illuminate the transparent indication area 122 of the keycap 12, and the opaque covering layer 32 can reduce light leakage. In practice, if the membrane circuit board 17 can provide the desired masking effect, the above opaque covering layer 32 can also be omitted (or the opaque covering layer 32 is structurally integrated into the membrane circuit board 17).

As discussed above, in the illuminated keyswitch structures 1 and 3, the light-emitting surface 202b of the light-guiding layer 202 of the keyswitch backlight structure 20 is provided with the surface microstructures 202c to diffuse light and make it soft. Even if the light is received by user's eyes, the eye irritation can also be improved. Compared with the prior art, the keyswitch backlight structure 20 according to the invention can effectively reduce the impact of light leakage on the user's vision without reducing the intensity of the backlight and excessively restricting the range provided by the backlight with a mask, and still can provide sufficient illumination for the transparent indication area 122 of the keycap 12.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A keyswitch backlight structure, comprising:
  a light-guiding layer, the light-guiding layer having a bottom surface, a light-emitting surface opposite to the bottom surface, and a surface microstructure formed on the light-emitting surface;
  a reflective layer, disposed under the light-guiding layer opposite to the bottom surface; and
  a transparent adhesive layer, closely attached to and between the reflective layer and the light-guiding layer corresponding to the surface microstructure;
wherein a low reflective layer is formed corresponding to the surface microstructure on a surface of the reflective layer facing the light-guiding layer, and a reflectance of the low reflective layer is lower than a reflectance of the reflective layer.

2. The keyswitch backlight structure according to claim 1, wherein the surface microstructure is located within a projection of the transparent adhesive layer on the light-emitting surface.

3. The keyswitch backlight structure according to claim 1, wherein the transparent adhesive layer is distributed in a straight shape, a U shape, an n shape or a rectangle square.

4. The keyswitch backlight structure according to claim 1, wherein a light transmittance of the transparent adhesive layer is greater than or equal to 90%.

5. The keyswitch backlight structure according to claim 1, wherein the low reflective layer is distributed in a straight shape, a U shape, an n shape, or a rectangle shape.

6. The keyswitch backlight structure according to claim 1, further comprising an opaque covering layer, stacked on the light-emitting surface of the light-guiding layer, wherein the opaque covering layer has an opening, and the surface microstructure is exposed from the opening.

7. An illuminated keyswitch structure, comprising:
 a base plate;
 a keyswitch backlight structure, stacked on or under the base plate, the keyswitch backlight structure comprising a light-guiding layer, a reflective layer, and a transparent adhesive layer, the light-guiding layer having a bottom surface, a light-emitting surface opposite to the bottom surface, and a surface microstructure formed on the light-emitting surface, the reflective layer being disposed under the light-guiding layer opposite to the bottom surface, the transparent adhesive layer being closely attached to and between the reflective layer and the light-guiding layer corresponding to the surface microstructure;
 a keycap, disposed above the base plate, the keycap having a transparent indication area; and
 a supporting mechanism, the supporting mechanism being connected to and between the base plate and the keycap so that the keycap moves up and down relative to the base plate and the keyswitch backlight structure through the supporting mechanism;
wherein light entering the light-guiding layer exits the light-guiding layer through the light-emitting surface to illuminate the transparent indication area; and
wherein a low reflective layer is formed corresponding to the surface microstructure on a surface of the reflective layer facing the light-guiding layer, and a reflectance of the low reflective layer is lower than a reflectance of the reflective layer.

8. The illuminated key switch structure according to claim 7, wherein the surface microstructure is located within a projection of the transparent adhesive layer on the light-emitting surface.

9. The illuminated keyswitch structure according to claim 7, wherein the transparent adhesive layer is distributed in a straight shape, a U shape, an n shape or a rectangle square.

10. The illuminated keyswitch structure according to claim 7, wherein a light transmittance of the transparent adhesive layer is greater than or equal to 90%.

11. The illuminated keyswitch structure according to claim 7, wherein the low reflective layer is distributed in a straight shape, a U shape, an n shape, or a rectangle shape.

12. The illuminated keyswitch structure according to claim 7, wherein the base plate is stacked on the light-emitting surface of the light-guiding layer and has an opening, and the surface microstructure is exposed from the opening.

13. The illuminated keyswitch structure according to claim 7, wherein the surface microstructure is located directly below the transparent indication area.

14. The illuminated keyswitch structure according to claim 7, further comprising a light source for generating the light, wherein the light-guiding layer has a light incident side surface between the bottom surface and the light-emitting surface, and a light-emitting surface of the light source faces the light incident side surface.

15. The illuminated keyswitch structure according to claim 7, further comprising an opaque covering layer, stacked on the light-emitting surface of the light-guiding layer, wherein the opaque covering layer has an opening, and the surface microstructure is exposed from the opening.

16. The illuminated keyswitch structure according to claim 7, wherein a projection of the keycap on the light-emitting surface has a center area and a peripheral area surrounding the center area, and the surface microstructure is located within the peripheral area.

\* \* \* \* \*